United States Patent
Faiss et al.

(10) Patent No.: US 6,866,430 B1
(45) Date of Patent: Mar. 15, 2005

(54) CABLE SPLICING APPARATUS AND METHOD

(75) Inventors: Glen D. Faiss, Huntsville, AL (US); James J. Galipeau, Union Grove, AL (US); George C. Chandler, Grant, AL (US)

(73) Assignee: SCI Systems, Inc., Huntsville, AL (US)

( * ) Notice: Subject to any disclaimer, the term of this patent is extended or adjusted under 35 U.S.C. 154(b) by 0 days.

(21) Appl. No.: 10/647,041

(22) Filed: Aug. 22, 2003

(51) Int. Cl.[7] .............................................. G02B 6/255
(52) U.S. Cl. ............................. 385/96; 385/95; 385/98
(58) Field of Search .................... 385/95–100; 174/70 S

(56) References Cited

U.S. PATENT DOCUMENTS

| | | |
|---|---|---|
| 4,497,537 A | 2/1985 | Dench |
| 4,577,925 A | 3/1986 | Winter et al. |
| 4,606,605 A | 8/1986 | Ashkin et al. |
| 4,696,542 A | 9/1987 | Thompson |
| 4,846,545 A * | 7/1989 | Estabrook et al. ............ 385/99 |
| 4,913,516 A | 4/1990 | Ikeda |
| 5,013,127 A | 5/1991 | Bernard |
| 5,050,957 A | 9/1991 | Hamilton et al. |
| 5,333,230 A | 7/1994 | Hata et al. |
| RE34,732 E | 9/1994 | Iri et al. |
| 5,509,097 A | 4/1996 | Tondi-Resta et al. |
| 2003/0113080 A1 | 6/2003 | Oxford et al. |
| 2003/0113092 A1 | 6/2003 | Porter |

* cited by examiner

*Primary Examiner*—Leo Boutsikaris
(74) *Attorney, Agent, or Firm*—Kramer Levin Naftalis & Frankel LLP; Lanier Ford Shaver & Payne P.C.

(57) ABSTRACT

Two fiber optic cables are spliced together so as to provide a relatively high strength splice without increasing the diameter of the cable and without degrading cable flexibility at the splice. The strength elements from one cable are used to replace the strength elements at the end of the other cable, after the fiber optic cores of the cables have been fused together. The splicing equipment advantageously uses elongated conduits to hold unwound strength elements out of the way to allow the cores to be fused and to prevent unwanted distortion of the cable during rewinding.

20 Claims, 4 Drawing Sheets

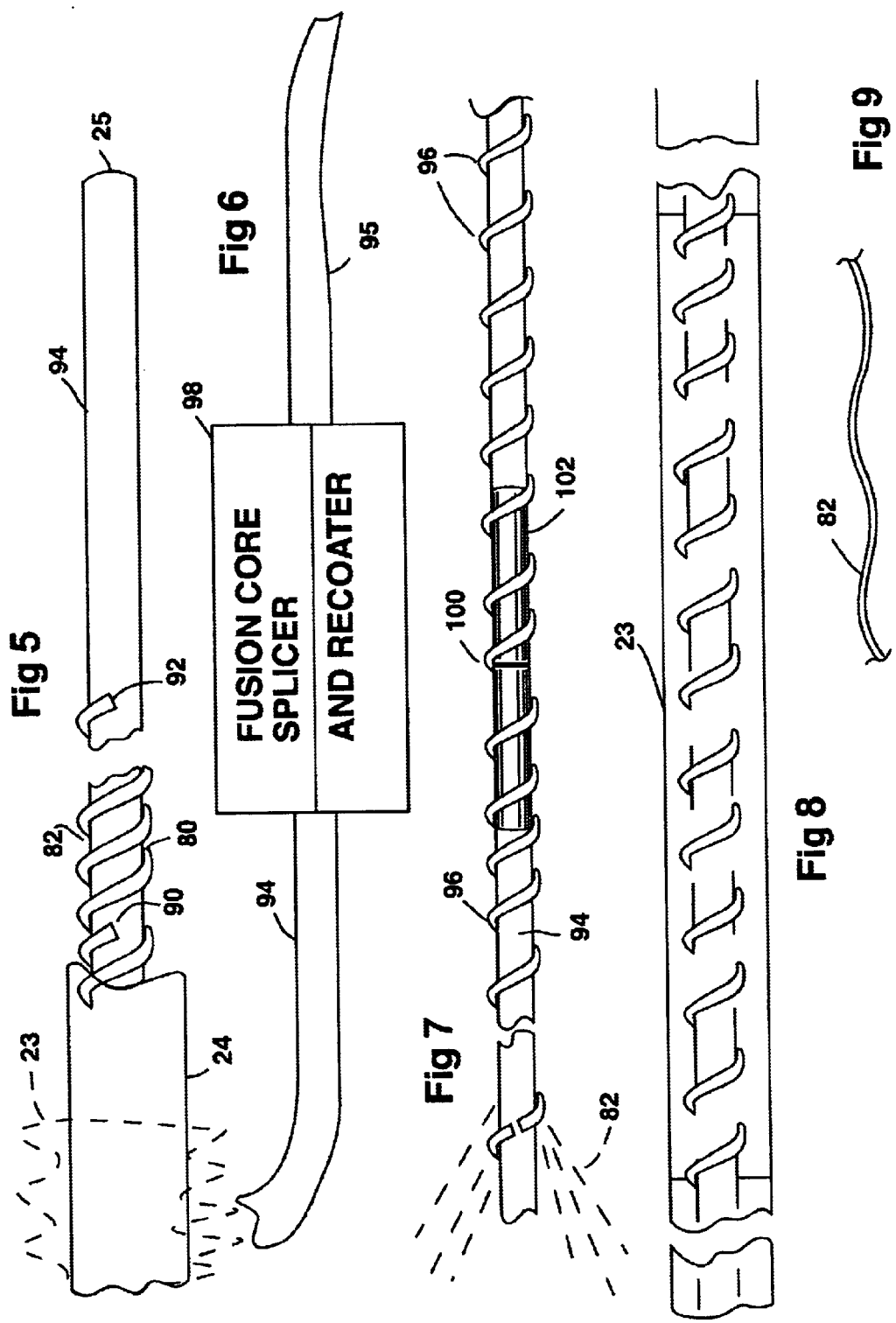

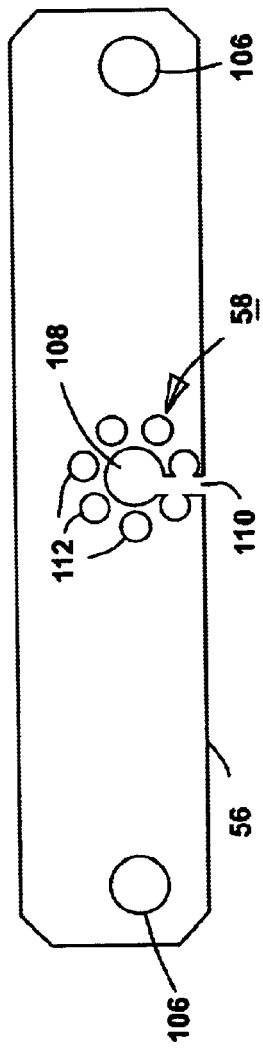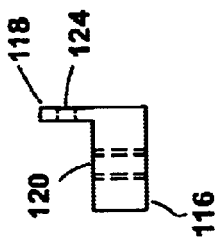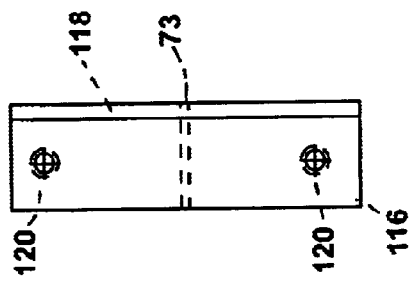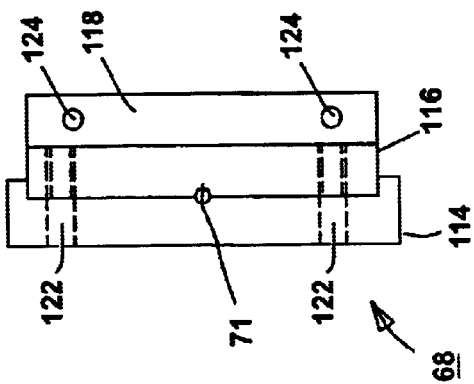

CABLE SPLICING APPARATUS AND METHOD

This invention relates to the splicing of cable, and particularly to splicing underwater fiber-optic cable.

In the splicing of cable, including underwater cable, a bulky splice often is used to make the cable strong.

In the cable dispensing equipment and method disclosed in the co-pending patent application Ser. Nos. 10/074,321 filed Feb. 12, 2002 and 10/237,761, filed Sep. 9, 2002, both of which are assigned to the same assignee as this patent application, a particularly advantageous underwater cable dispenser is disclosed. In that dispenser, cable to be dispensed is wound on a large reel, and the cable is dispensed by guiding it over the end flange of the reel.

For proper operation of the dispensing system, it is highly advantageous and, under some circumstances, necessary to use cable which has a constant diameter throughout its length. Thus, many bulky and inflexible splices which often have been used in the past are not acceptable.

Accordingly, one of the objects of the present invention is to provide a cable splicing method and apparatus that produces a splice which is less bulky, is flexible, and preferably is of the same diameter as the remainder of the cable, so that the cable, after splicing, has a uniform diameter throughout its length.

It is another object to provide a splice that results in a cable with a uniform diameter and yet has a relatively high level of tensile strength and resistance to parting at or near the splice.

Underwater cable, and particularly underwater fiber-optic cable usually has strength elements such as multiple wires wound to form armor for the cable, as well as strength elements. The strength elements make the job of splicing the cable more difficult, and can interfere with fusion coupling of the fiberoptic cores of the two cable ends.

Therefore, it is a further object of the invention to provide a splicing device which minimizes these problems.

Another object of the invention is to provide a splicing apparatus and method which achieves the foregoing objects without excessive cost and is efficient to operate.

In accordance with the present invention, the foregoing objects are satisfied by the provision of a fiber optic cable in which the helical strength numbers, e.g., wire from one cable end are interlaced with the strength members near the end of the other cable to be spliced. Preferably, the strength members from one end are unwound so as to expose and free the core of the cable for fusion bonding with the core of the other cable. The unwound wires are temporarily held in a strength element holding structure having a plurality of conduits into which the strength members are inserted. The holding conduits diverge away from the core of the cable to hold the strength members away from the cable in the vicinity where the cores are to be joined together.

Strength elements also are unwound from the end of the other cable to be joined. Then, the cores are joined in optical alignment with one another, and the strength members from one of the cables is rewound on the first cable, over the junction between the cores, and onto the second cable. The strength elements have been cut away the end of the second cable, preferably in a staggered fashion. Each strength element is cut to a different length from the end of the second cable. When the strength elements of the first cable are rewound, they are wound onto the end of the second cable until each meets the cut end of a strength member of the second cable. Thus, the rewound strength elements from the first cable interleave with the strength members of the second cable and bind the two cable ends together flexibly and without any bulges in the cable.

The cable, after rewinding, is compacted to force the strength elements tightly against the core. Preferably, this is done by means of a die through which the rewound cable components are pulled.

The rewinding mechanism advantageously rotates the conduits provided for storage of the loose strength members, while simultaneously traversing along the length of the cable, at a speed directly proportional to the speed of rotation of the winding structure, thus rewinding the strength members with the same lay angle that they had when they originally were wound.

The outer coating of the cable, which was removed to unwind the strength elements, now is replaced. Thus, a strong junction between the cables as been produced without increasing the diameter of the cable at the junction, and the cable has a uniform diameter along its length.

The foregoing and other objects and advantages of the invention will be set forth in or apparent from the following description and drawings:

FIG. 5 is a schematic view of one end of one of the cables to be spliced, illustrating the method of the present invention;

FIG. 6 is a schematic view illustrating the process of fusing the fiber optic cores to one another and recoating the junction;

FIG. 7 is a schematic side elevation view illustrating the rewinding process used in the present invention;

FIG. 8 is a side elevation and partially schematic view illustrating the application of a outer coating to the splice;

FIG. 9 is a side elevation view of a length of the helical wire strength element used in the cable of the present invention;

FIG. 10 is a front elevation view of one of the components of the machine shown in FIG. 1;

FIG. 11 is a front elevation view of the die block shown in FIG. 1;

FIG. 12 is a side elevation view of one of the components of the FIG. 11 structure; and FIG. 13 is a bottom plan view of the component of FIG. 12.

Cable Construction

Figure 4:
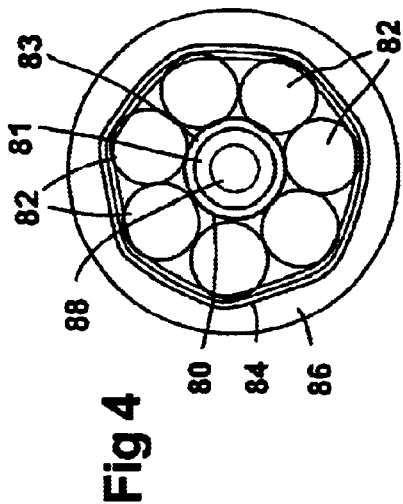
FIG. 4 is a cross-sectional view of a cable to be spliced to a like cable.
Figure 3:
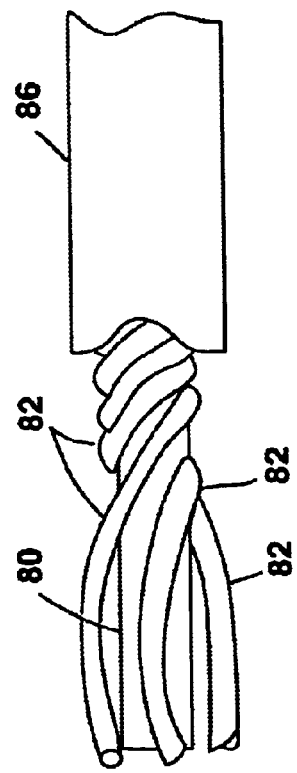
FIG. 3 is a side elevation view of a cable with the strength members partially unwound from one end.

FIGS. 3 and 4 of the drawings show the specific cable for which the splicing device and method of the present invention were created.

As it is shown in FIG. 4, the cable includes an extruded outer cover 86, a laminated metal and plastic tape 84 wrapped around seven strength elements 82. the strength elements are hard, resilient wires made of Inconel 625. They are pre-bent to a helical shape, as shown in FIG. 9, before being wound onto the core during the manufacture of the cable.

The strength members are wrapped around a core having primary and secondary buffer layers 81 and 83, respectively, and a central fiber-optic conductor 88. The cable is relatively slender (e.g., less than ⅛ inch in diameter) but is rugged enough to resist fish bite and other marine animal damage, and is capable of being used to form underwater cables of more than 100 km length.

FIG. 3 is a side elevation view of the cable shown in FIG. 4, with the outer cover 86 and the tape 84 removed from the end, and some of the strength members 82 partially unwound from the end.

The cable shown in FIGS. 3 and 4 is described in greater detail in copending patent application Ser. No. 10/237,861 filed Aug. 9, 2002, claiming priority from provisional patent application Ser. No. 60/340,416, filed December 14, 2001. The disclosures of those patent applications hereby is incorporated herein by reference.

It should be understood that the use of the present invention is not limited to the specific cable shown, but that the invention can be used with any cable having the same or similar problems.

Splicing Machine

Figure 1:
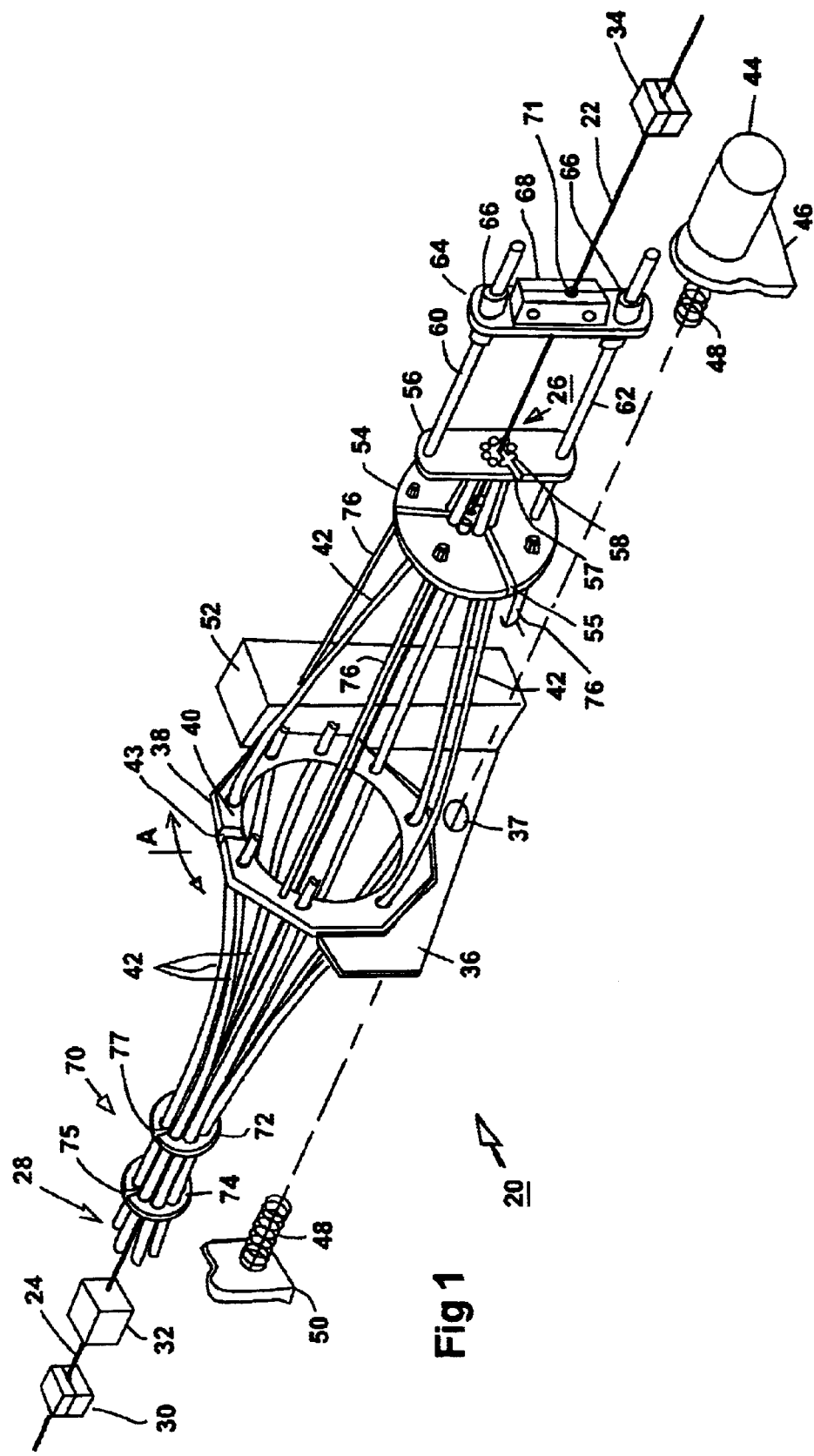
FIG. 1 is a perspective, partially schematic view of the preferred embodiment of the spicing apparatus of the present invention.

FIG. 1 is perspective view of a splicing machine 20 constructed in accordance with the present invention, shown together with first and second cables 22 and 24 to be spliced together.

The splicing machine 20 includes a central carriage 36 which is mounted on guide rods (not shown) to travel parallel to the direction in which the cables 22 and 24 extend. A gear motor 44 mounted on a vertical end plate 46 drives the carriage 36 by means of a long lead screw 48 engaging a threaded opening 37 in the carriage. The lead screw is rotatably supported at its other end to a vertical plate 50. The lead screw can be rotated in either the clockwise or counterclockwise direction to move the carriage 36 along its guides.

It should be understood that the machine 20 has a base and other structure joining the end plates 46 and 50 and the guide rails. However, this structure is not shown in the drawings for the sake of clarity.

A metal ring 40 is rotatable mounted in a bearing structure 38 which is secured to the carriage 36. The ring is rotated by means of a drive mechanism indicated schematically at 52. The ring 40 can be rotated in either of the directions indicated by the arrow A, simultaneously with the movement of the carriage 36 longitudinally on its guides. The ratio of the speeds of longitudinal movement of the carriage 36 and rotation of the ring 40 is kept constant to control the winding and unwinding of the wires 82 so as to match the lay angle of the wires when they were wound during manufacture of the cable.

In accordance with one of the features of the present invention, a plurality of elongated conduits 42 made of flexible material such as PVC are provided to form a storage structure for the strength elements unwound from at least one of the cables so as to hold the strength elements out of the way during other steps in the splicing process, and to protect them from deformation.

Figure 2:
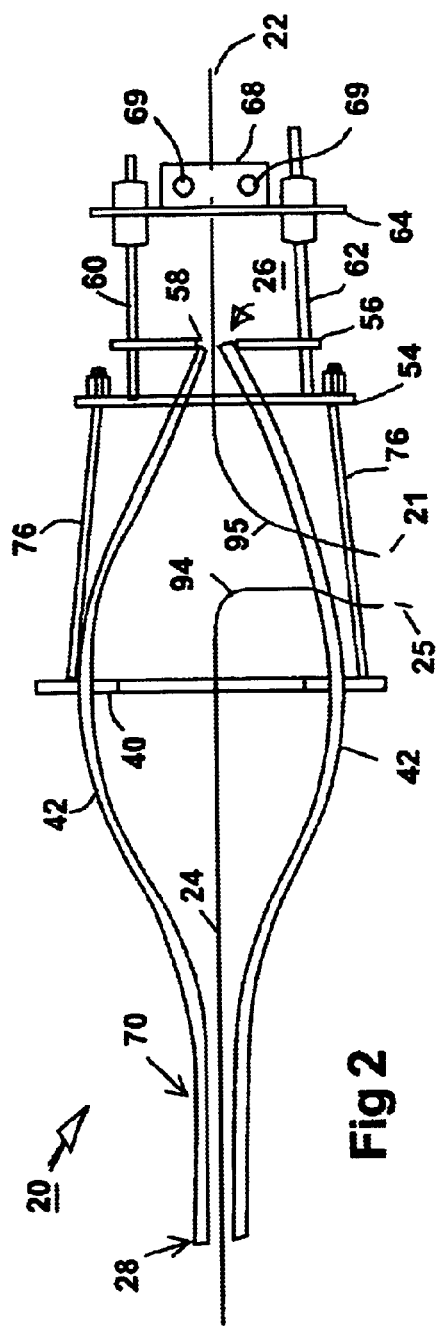
FIG. 2 is a simplified schematic side elevation view of some of the operative components of FIG. 1.

As it is shown both in FIG. 1 and in the simplified drawing of FIG. 2, each of the conduits 42 extends from the left end portion 28 of the splicing machine towards the right end portion 26. There are seven of the conduits, one for each of the seven strength elements or wires 82 in the cable. (only two conduits are shown in FIG. 2, for the sake of simplicity).

Traveling from left to right in the drawings, each conduit starts with a relatively straight section 70 where the conduits are held together by plates 72 and 74. Each conduit then diverges outwardly from the central longitudinal axis of the splicing machine 20, which coincides with the centers of the cables 24 and 22. Each conduit then passes through holes in the ring 40, then converges back towards the central longitudinal axis through a circular support plate 54 and through holes in an elongated support plate 56 (also see FIG. 10) where the entrance holes 58 to the conduits 42 are relatively close to the central longitudinally axis of the machine.

Thus, the conduits hold the wires 82 unwound from the cable 22 away from the central axis of the splicing machine near the center of the conduits to provide space to fuse the cores of the cables together and rewind the wires 82 without deforming them.

The plate 54 is secured to the ring 40 by four tie rods 76 so that the plate 54 rotates with the ring, as do the conduits 42.

Referring to FIG. 10, as well as to FIG. 1, the plate 56 is mounted on a pair of guide rods 60 and 62 which are secured at their left ends in holes 106 in the plate. Therefore, the guide rods 60 and 62 also rotate with the ring 40 and the conduits 42.

The array 58 of holes 112 for the conduits has a slot 110 which serves as an exit for removing the spliced cable sideways from the machine 20 when it is finished because it cannot easily be removed lengthwise. The plates 72, 74 and 54 and the ring 40 and its support have slots 75, 77, 43 and 55 for the same purpose.

Adjustably positioned on the guide rods 60 and 62 is a die support plate 64 to which is secured a die block 68.

Referring now to FIGS. 11–13, as well as to FIG. 1, the die block 68 has a central hole 71 of the desired diameter of the finished cable. The block 68 is formed by two separate die blocks 114 and 116 with semicircular channels. The channel in block 116 is shown at 73 in FIG. 12. The die blocks 114 and 116 are clamped together by means of bolts 69 (FIG. 1) extending through holes 120, 122 (FIGS. 11–13).

The die block 68, the plate 56, the plate 54 and the tie rods 76 all rotate together with the ring 40 as it is rotated by the drive mechanism 52.

The die block 68 is formed in two halves bolted together so as to enable the two halves to be separated to allow sideways removal of the cable from the machine 20 when splicing is complete.

Splicing Process

The process of using the splicing machine 20 to splice the two cables 22 and 24 together now will be described.

First, the left end of the cable 22 has its outer coating 86 and laminated tape 84 stripped to a suitable length. In this case, it is convenient to strip the cable to a substantial length, e.g., 12 feet. The wire strength elements 82 are unwound by hand to a length of about 6 feet from the end of the cable. This frees about six feet of the core 80 which then is fed through the central holes in the plates 54 and 58 (see central hole 108 in FIG. 10, for example), and is extended to the clamp 30 and clamped.

At this point, the carriage 36 is near the left end of the machine 20 and the loose six foot long sections of unwound armour wire 82 are fed into the right-hand ends of the conduits 42. They are fed carefully so as not to bend and permanently deform any of the wires, since they need to be rewound in their original shapes.

Then, the right end of the cable is clamped with the cable 22 under tension.

Next, unwinding of the wire 82 from the cable 22 is completed. This is done by using the drive system described above to rotate the ring 40 and the conduits 42 while simultaneously moving the carriage 36 to the right in FIG. 1 at a predetermined speed relative to the speed of rotation of the ring 40, so as to match the unwinding to the lay angle of the wire 82 and keep from distorting it.

When the unwinding is complete, the core 80 is unclamped and trimmed to a length of about 27 inches, the length needed in this specific example. The longer core length was provided temporarily to provide something to clamp onto to hold the cable during unwinding, and to provide a sufficient length of free wire to span the core junction and interweave with the wires on the other cable.

Next, the right hand end of the second cable 24 has the outer cover and metal tape removed from it to a distance sufficient to enable removal of wires 82 as described below.

The wires 82 are unwound from the end of the second cable 24 one at a time. One is unwound to a distance of five feet from the right end of cable 24 and is cut; the next is unwound to a distance of four and one-half feet and cut; the third to a distance of four feet and cut, and so forth at six inch intervals until all seven wires have been unwound and cut. Then, the cut ends of the wires are temporarily secured in place with epoxy or other temporary holding means.

FIG. 5 illustrates schematically two of the staggered ends 90 and 92 of the strength elements 82 as they would appear after the staggered unwinding and cutting process described above has been completed.

Next, the end of cable 24 with the exposed core is fed longitudinally towards the right between the conduits 42 through the straight section 70, until the cable reaches the center section just past the ring 40. Then, the end of the core is trimmed to a length of 27 inches beyond the nearest cut end of a wire 87.

At this point, the flexible core end sections 94 and 95 (see FIG. 2) are limp and can be pulled outside of the enclosure formed by the conduits 42 so that the ends 21 and 25 shown in FIG. 2 can be fused together.

FIG. 6 shows the next step of the process in which the ends 94 and 95 of the two cables are inserted into a standard fusion core splicer such as one made and sold by the Ericsson Company, Model #FSU995FA which optically aligns the fiber optic conductors and fusion bonds the cores together. Then, the resulting junction 100 (FIG. 7) and the adjacent ends of the core are encapsulated by a conventional recoating machine to provide a coat 102 to protect the junction and the core elements.

Although the steps are illustrated as if they were performed by the same machine in FIG. 7, actually the acrylic coding is applied by a separate machine, a conventional recoating machine called Vytran model #VYT-200-C.

After the cores have been fusion bonded, optically aligned and recoated, the cables 22 and 24 are pulled tight, with the ends clamped by clamps 30 and 34, and with the tension being measured by the tension measurement unit 32 to make certain that the core is not pulled too tight. The unit 32 can be of the type disclosed in the above-described co-pending patent application Ser. No. 10/074,321. This holds the core straight and readies it for rewinding.

Rewinding Process

Now the rewinding process is started. The wires stored in the conduits 42 are now rewound about the core of the cable 22, and the junction 100 between the cores 100 and onto the core 94 of the second cable 24.

The rotation of the ring 40 and the longitudinal movement of the carriage 36 are in directions opposite to those during unwinding. Again, the speed ratio of the ring 40 to the carriage is set so that the wire is rewound at its original lay angle.

FIG. 7 illustrates schematically various loops of wire 96 which represent the rewound strength elements.

As the wire 82 is being rewound, the reconstituted cable is being pulled through the die block 68. This has the effect of compacting the wires 82 and the core on which it is wound to insure that the cable achieves the desired uniform diameter, and to eliminate any slack in the wires.

The position of the die can be adjusted by sliding it along guide rods 60 and 62 to adjust the divergence angle of the wires.

As the wires 82 are wound onto the end 94 of the core of the cable 24, each one of the seven wires ultimately will reach a cut end such as 90 or 92 of one of the wires 82 on the cable 24. At that point, the rewinding pauses, and the wire 82 being rewound is cut so that its cut end abuts against one of the cut ends of the wires 82 on cable 24. Thus, the strength element from the first cable has replaced the strength element from the second cable over a certain distance. As the strength element is wound around the core, it grips the core and helps provide tensile strength for the spliced cable.

Because each of cut ends of the strength members in cable 24 are located at a different positions along the cable, the splice is very strong. It is believed that the tensile strength of the cable at the splice is approximately 6/7th of the tensile strength elsewhere. This is believed to be due to the fact that the tensile strength of the cable is reduce by only 1/7th of the total strength of all seven strength members because multiple junctions between strength wires do not occur at the same longitudinal position.

After the rewound wires from the first cable are cut, the abutting ends of the two wires are joined by means of conductive epoxy, which is applied to both wire ends. The conductive epoxy provides a continuation of the electrically conductive path of each of the wires, a feature which is highly desirable.

Finally, a coating 23 (FIG. 8) is applied over the area over from which the coating 86 has been removed.

One way in which this can be done is shown schematically in FIG. 5 where shrink wrap material 23 is applied to the covered cable portions before stripping begins and remains there until the rewinding process is complete. This shrink wrap material is then spread over the length of the area to be coated and heat shrunk in place to give a smooth continuous coating as shown in FIG. 8.

Alternatively, the coating 23 can be extruded from a die, by techniques well known to those skilled in the art which will not be described in greater detail here.

The splice not only maintains the desired diameter of the cable, but it also maintains the flexibility of the cable to allow it to bend almost as readily as if there were no splice.

Variations

The motion of the carriage 36 can be synchronized with the rotation of the ring 30 by several different means. For example, gear drive systems can be used for this purpose. Alternatively, a servomotor system including the gear motor 34 and a separate motor for rotating the ring 40 can be used, and the proper ratio of motion maintained by the servo system.

Compacting means other than the die block 68 also can be used. For example, rollers with curved surfaces or other such means can be used to compact the cable components together.

The above description of the invention is intended to be illustrative and not limiting. Various changes or modifications in the embodiments described may occur to those skilled in the art. These can be made without departing from the spirit or scope of the invention.

What is claimed is:

1. A method of splicing first and second fiber-optic cables, each having a core and a plurality of strength elements extending around said core, said method comprising the steps of:
    (a) unwinding said strength elements for a distance from one end of said first cable;
    (b) unwinding said strength elements for a distance from one end of said second cable;
    (c) fusing said cores of said cables together at a junction, with said cores in optical alignment with one another;
    (d) rewinding said strength elements on said core of said first cable, overlapping said junction, and replacing said strength elements of said second cable for a distance spaced from said junction; and
    (e) compacting the rewound strength elements with the cores they are wound on.

2. A method as in claim 1 including the step of removing a part of each of said strength elements of said second cable after unwinding them, said parts having lengths different from one another, and cutting each of the strength elements from said first cable to fill the empty spaces left by the removing step.

3. A method as in claim 1 in which said first and second cables are of the same diameter, and in which each cable has an outer cover covering said strength elements, and including the step of removing said outer covers from said ends of said cables before unwinding said strength elements, and including the step of re-covering said ends of said cable to give the resulting cable a substantially uniform diameter over its length.

4. A method as in claim 1 in which said strength elements are resilient helical wires.

5. A method as in claim 1 including inserting each of said strength elements unwound from said first cable into an elongated conduit extending away from said core of said first cable to hold said strength elements away from said core at least during said fusing step.

6. A method as in claim 5 said rewinding step comprising rotating said conduits in a rewinding direction about said core of said first cable while moving said conduits longitudinally of said core toward said junction at a predetermined rate relative to the rate of rotating of said conduits.

7. A method as in claim 6 in which the unwinding of said strength elements from said first cable includes rotating said conduits in a direction opposite said rewinding direction, while moving said conduits away from said end of said core of said first cable.

8. A method as in claim 1 in which said compacting step comprises passing said rewound strength elements, and the cores on which they are wound, through a die.

9. A method as in claim 6 in which said compacting step comprises passing said rewound strength elements, and the cores on which they are wound, through a die while coupling said die to rotate and move with said conduits.

10. A method as in claim 2 in which the cut ends of the strength elements of said first cable are closely adjacent the cut ends of the strengths elements of said second cable, and applying a quantity of conductive epoxy to each pair of adjacent cut ends to connect said ends together.

11. A method as in claim 3 in which said re-covering step is selected from the group consisting of (a) applying a shrink-wrap cover on said cable and shrink-fitting it in place, and (b) extruding a plastic cover onto the portion of said resulting cable needing it.

12. A method of splicing first and second like cables together to form a continuous cable of substantially uniform diameter, said first cable having a first fiber optic core, first strength elements wound around said first core, and a first outer cover, said second cable having a second fiber optic core, second strength elements wound around said second core and a second outer cover:
    (a) removing said outer cover from one end of each of said cables;
    (b) unwinding said first strength elements from said first core for a first distance and inserting each into a conduit to hold it away from said first core;
    (c) unwinding said second strength elements from said second core, to different distances;
    (d) cutting the unwound second strength elements at said different distances;
    (e) shortening said first core;
    (f) joining said cores in optical alignment with one another at a junction;
    (g) rotating said conduits while moving them longitudinally towards said junction and beyond;
    (h) passing the rewound cable through a die to compact the rewound strength elements and cores together;
    (i) cutting each of said first strength elements to the length of the removed second strength element it replaces;
    (j) conductively joining the adjacent abutting ends of said first and second strength elements together; and
    (k) placing a cover on the portion of the resulting single cable which has none.

13. A method as in claim 12 including first rotating and moving said conduits in a direction opposite that in which said conduits are rotated during rewinding to a least complete the unwinding of said first cable, and coupling said die to travel and rotate with said conduits during rewinding.

14. A fiber optic cable splicing machine for joining together two cables each having a plurality of strength elements wound around a fiber-optic core, said machine comprising:
    (a) a storage structure for storing a length of each of a plurality of strength elements unwound from one of said cables to expose a length of the core of said one cable to enable it to be joined to the core of the other cable;
    (b) a winding mechanism for rewinding said strength elements onto said one cable, over a junction at which said cores are joined together, and onto the core of said other cable in place of strength elements removed from the end of said other cable.

15. A splicing machine as in claim 14 including a compacting device positioned to force rewound strength elements toward the core around which it, is wound to maintain an even diameter for the joined cables.

16. A splicing machine as in claim 14 in which said storage structure has a plurality of conduits each extending longitudinally of said one cable and having two ends, one end being adjacent said one cable near the point at which one of said strength members meets said one core, said conduits diverging away from said one cable to hold unwound strength members away from the core, said winding mechanism including drive means for rotating said storage structure around said cores while moving said storage structure longitudinally of said cores at a predetermined rate of speed.

17. A splicing machine as in claim 16 in which said strength members are helical wires.

18. A splicing machine as in claim 15 in which said compacting device comprises a die through which the rewound cable is moved.

19. A splicing machine as in claim 18 in which said die is secured to said conduits to move and rotate with said conduits.

20. A splicing machine as in claim 14 including clamps for holding each of said cables during rewinding, each clamp being located at a substantial distance from the ends to be joined.

* * * * *